Nov. 22, 1966  W. L. KIBLER  3,286,932
WINTER-SUMMER WINDSHIELD WASHER SYSTEM
Filed May 25, 1964  2 Sheets-Sheet 1
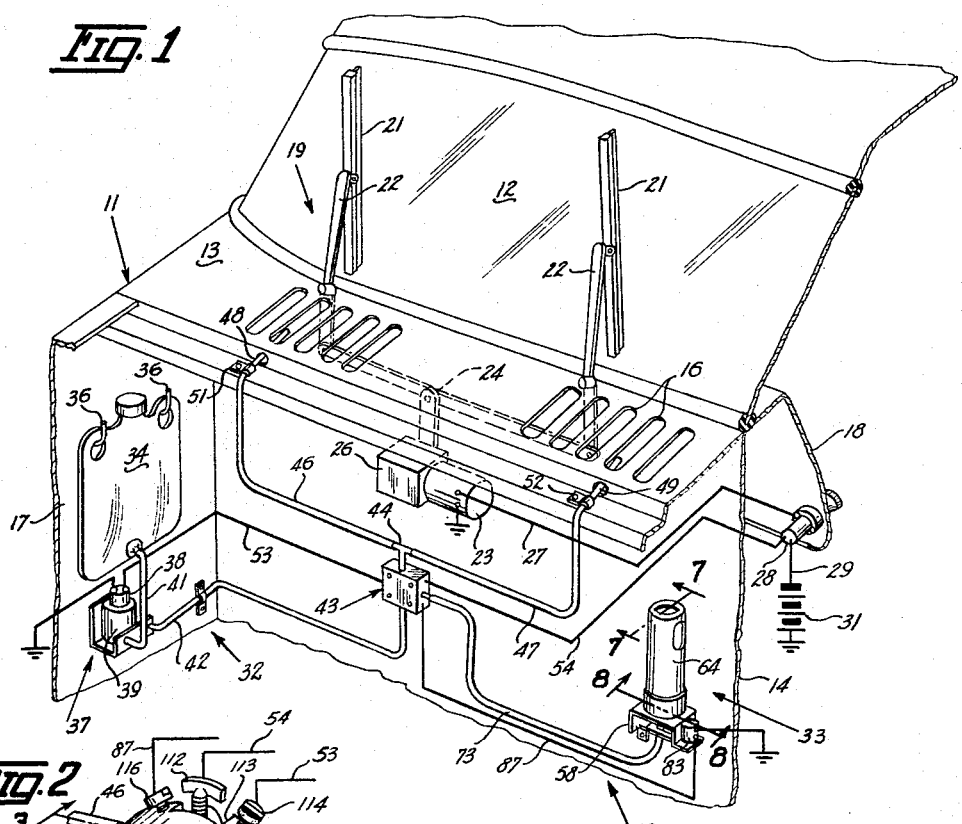
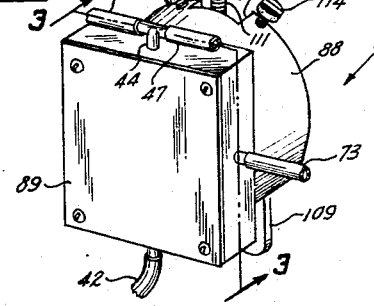
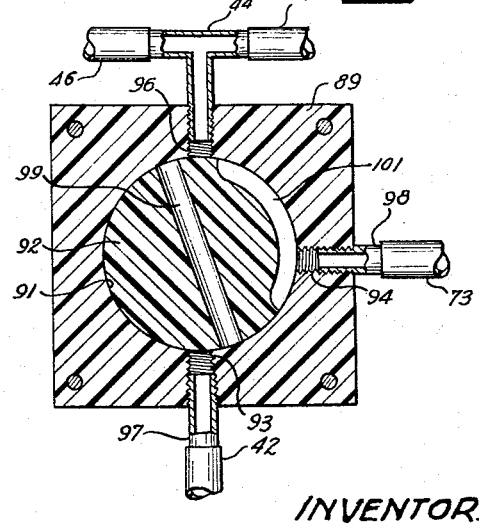
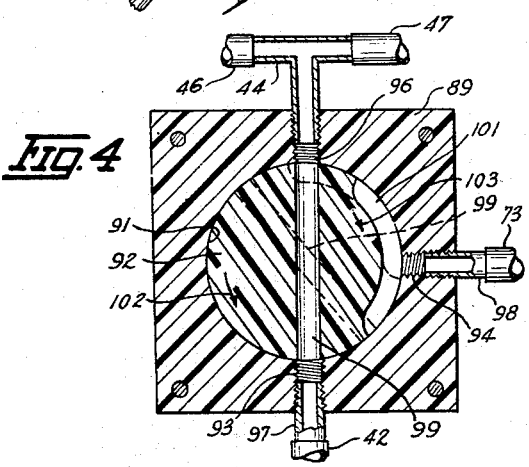
INVENTOR.
WILLIS L. KIBLER
BY *Rudolph L. Powell*
ATTORNEY.

Nov. 22, 1966  W. L. KIBLER  3,286,932
WINTER-SUMMER WINDSHIELD WASHER SYSTEM
Filed May 25, 1964  2 Sheets-Sheet 2
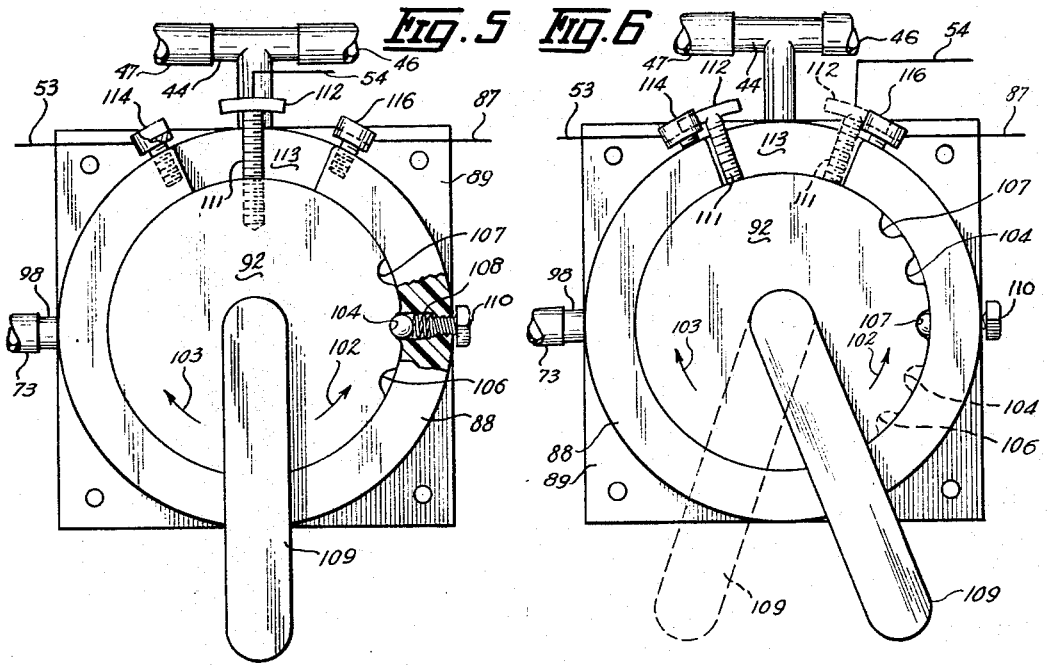
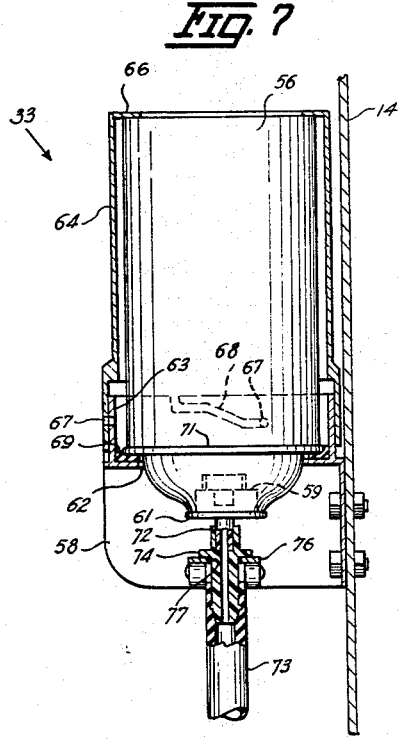
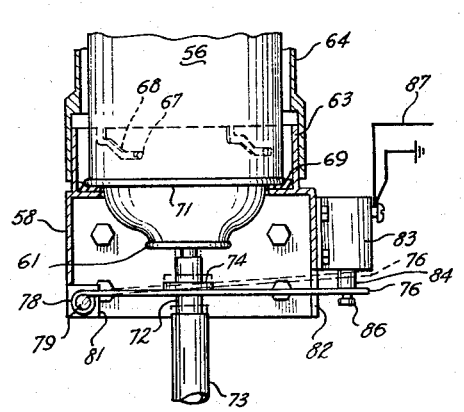
INVENTOR.
WILLIS L. KIBLER
BY Rudolph L. Lowell
ATTORNEY.

United States Patent Office 3,286,932
Patented Nov. 22, 1966

3,286,932
WINTER-SUMMER WINDSHIELD WASHER SYSTEM
Willis L. Kibler, Detroit, Mich., assignor, by mesne assignments, to Putnam Equipment Corporation, Cookeville, Tenn., a corporation of Tennessee
Filed May 25, 1964, Ser. No. 369,682
2 Claims. (Cl. 239—284)

This invention relates to fluid dispensing devices and more particularly to a windshield washer system for a vehicle equipped with a windshield.

It is the object of this invention to provide an improved windshield washer system having separate washer units alternatively usable in accordance with the season of the year.

Another object of the invention is to provide a windshield washing system having a plurality of separate cleaning fluids usable for different windshield cleaning conditions.

A further object of the invention is to provide a windshield washing system with a disposable solvent storing container having a supply of liquid solvent under gaseous pressure.

Another object of the invention is to provide a windshield washing system having two separate washer units with a switch and valve assembly operable to selectively connect the washer units with fluid discharging nozzle means and with a source of energy.

An additional object of the invention is to provide a rugged and versatile windshield washing system for an automobile which is economical in construction and reliable and efficient in operation.

These and other objects and advantages of this invention will become readily apparent upon reference to the following description and the accompanying drawing, wherein:

FIG. 1 is a fragmentary perspective view of an automobile equipped with the windshield washing system of this invention;

FIG. 2 is an enlarged perspective view of the switch and valve assembly connected to the separate washer units of the windshield washing system of FIG. 1;

FIG. 3 is an enlarged sectional view taken along the line 3—3 of FIG. 2 showing the off position of the switch and valve assembly;

FIG. 4 is a view similar to FIG. 3 showing the on positions of the switch and valve assembly;

FIG. 5 is a rear elevational view of the switch and valve assembly of FIG. 2 showing the off position thereof;

FIG. 6 is a view similar to FIG. 5 showing the on positions of the switch and valve assembly;

FIG. 7 is an enlarged sectional view taken along the line 7—7 of FIG. 1; and

FIG. 8 is an enlarged fragmentary sectional view taken along the line 8—8 of FIG. 1.

Referring to the drawing, there is shown in FIG. 1 a windshield clearing system, indicated generally as 10, in assembled relation with a motor vehicle 11 shown in fragmentary form. The vehicle 11 has an upwardly and rearwardly extended windshield 12. Positioned adjacent the lower edge of the windshield 12 is a forwardly extended cowl 13 which is secured to a downwardly extended fire wall 14. The cowl 13 has a downwardly stepped front section for accommodating the hood (not shown) of the vehicle. Extended transversely across the cowl 13 are a plurality of elongated ventilating and heater air openings 16. The opposite end sections of the cowl 13 and the fire wall 14 are secured to the vehicle body side wall 17, one of which is shown. A dashboard 18 projects rearwardly and below the windshield 12.

The vehicle 11 is equipped with a wiper assembly indicated generally at 19 operable to remove water and foreign material from the outer surface of the windshield 12. The wiper assembly includes a pair of wiper elements 21 positioned in engagement with the outside surface of the windshield 12. Arms 22 support the wiper elements 21 on the cowl 13 adjacent the forward edge of the windshield 12. The wiper elements 21 and their respective arms 22 are oscillated with respect to the windshield 12 by an electric motor 23. A linkage 24 and power transmission unit 26 drivably connect the motor 23 with each of the arms 22.

The motor 23 is connected by a line 27 to a manually operated switch 28 mounted on the dashboard 18 within the reach of the operator of the vehicle. A line 29 couples the switch 28 to a battery 31. The switch 28 is rotatable between on and off positions to connect and disconnect the motor 23 with the battery 31. When the motor 23 is coupled to the battery 31 the power transmission unit 26 operates to move the linkage 24 thereby transmitting motion to the arms 22 which in turn oscillate the wiper elements 21 over the windshield 12.

The windshield washing system 10 comprises a first washer unit 32 and a second washer unit 33 which are alternatively usable to dispense a cleaning liquid on the windshield 12.

The first washer unit 32 has a reservoir 34 for storing a supply of washer liquid. Brackets 36 secured to the side wall 17 support the reservoir 34 in an upright position adjacent to the fire wall 14. Mounted on the side wall 17 below the reservoir 34 is a combination motor and pump assembly 37 comprising an electric motor 38 drivably coupled to an centrifugal pump 39.

A hose 41 connects the bottom of the reservoir 34 with the intake side of the pump 39 and functions to provide a direct fluid communication from the reservoir 34 to the pump. Since the pump 39 is positioned below the reservoir 34, the pump is always primed with cleaning liquid.

The outlet of the pump 39 is connected to a hose 42 and extends to a switch and valve assembly 43 mounted on the center portion of the fire wall 14. The switch and valve assembly 43 functions to direct fluid from the hose 42 to a T-coupling 44, which divides the stream of cleaning liquid into two separate hoses 46 and 47.

The opposite ends of the hoses 46 and 47 are connected to a pair of fluid dispensing nozzle assemblies 48 and 49 secured to the downwardly stepped front section of the cowl 13 by screws 51 and 52, respectively. The nozzle assemblies 48 and 49 project through corresponding holes in the upright portion of the downwardly stepped section of the cowl. Each nozzle assembly is in registration with one of the air openings 16. In operation, the nozzle assemblies 48 and 49 function to direct cleaning liquid onto the windshield 12 into the path of movement of the oscillating wiper elements 21.

The motor 38 is connected through the switch and valve assembly 43 to the battery 31. Line 53 couples the motor 38 with the switch portion of the switch and valve assembly 43 and line 54 leads therefrom to the switch 28. The operation and construction of the combined switch and valve assembly 43 is described hereinafter.

Referring to FIG. 7, the second washer unit 33 comprises a solvent storing container 56 held in an inverted position on a table 58 secured to the fire wall 14. The container 56 is a twenty-six ounce Aerosol can and has a conventional valve 59 projected from the cap 61. The container 56 holds a mixture of methanol and water subjected to carbon dioxide gas pressure. In use, the container 56 is initially provided with about eighteen ounces of fluid, such as methanol or methanol and water mixed to a ratio of 1 to 1 or a ratio of 1 to 2. The remaining volume in the container 56 is filled with carbon dioxide gas at about 50 p.s.i. The carbon dioxide gas is partially absorbed by the methanol. As the liquid is drawn from the container, the gaseous pressure therein gradually drops because the absorbed carbon dioxide is released. For example, a twenty-six ounce container having eighteen ounces of methanol or methanol mixed with water at ratios of 1 to 1 or 1 to 2 and carbon dioxide gas at 50 p.s.i. can be used approximately fifty times with a gradual reduction of pressure from 50 p.s.i. to about 20 p.s.i. as the container is exhausted.

The container 56 is held in an inverted position on the table 58 with the top portion thereof projected through a hole 62 in the top of the table 58. A cylindrical sleeve 63 secured to the top of the table 58 extends in an upward direction in axial alignment with the hole 62. A cylindrical housing 64 is telescoped over the sleeve 63 and extends upwardly adjacent the wall of the container 56. The top of the housing 64 has an inwardly directed annular flange 66 which engages the bottom of the container 56. The bottom end section of the housing 64 carries a plurality of inwardly directed studs 67 which coact with downwardly inclined slots 68 to hold the container 56 on the top of the table 58.

In order to increase the locking effectiveness of the housing 64 on the sleeve 63 an annular resilient ring member 69 is interposed between the top wall of the table 58 and the adjacent annular bead 71 of the container 56. The resilient member 69 biases the container 56 in an upward direction which in turn holds the inwardly directed studs 67 in the upwardly projected locking recesses in the terminal end of the slots 68.

The valve 59 is a conventional Aerosol can type of valve and opens in response to movement into the container 56. When the valve is open the cleaning liquid in the container 56 flows through a coupling 72 and a hose 73 to the switch and valve assembly 43. The upper end of the coupling 72 is fitted on the tubular member of the valve 59 and the lower end of the coupling 72 is fitted into the hose 73.

As shown in FIG. 7, the coupling 72 has an annular rib 74 and projects through a hole 77 in the lever 76 with the rib 74 engaging the top of the lever. As shown in FIG. 8, one end of the lever 76 is shaped into an eye 78. A pin 79 projects through the opening of the eye 78 and is connected as its opposite end to inwardly directed ears secured to the side wall of the table 58. The pin 79 in conjunction with the eye 78 of the lever pivotally mounts the lever on the table 58 for movement toward and away from the container 56. The opposite end of the lever projects through an upright slot 82 in the table 58.

A solenoid 83 is secured to the side wall of the table 58 immediately above the slot 82. The solenoid 83 has a movable core 84 which projects in a downward direction and is coupled to the lever 76 by a screw 86. A line 87 electrically couples the solenoid 83 to the switch portion of the switch and valve assembly 43.

The switch and valve assembly 43 is shown in FIGS. 2 to 6 and comprises a cylindrical body 88 secured to a rectangular shaped head 89. As shown in FIG. 3, the head 89 has a central bore 91 for accommodating a rotatable valve member 92. The head 89 has radial passages 93, 94 and 96 which open to the bore 91. A tubular member 97 is positioned in the passage 93 and projects laterally from the head 89 to receive the hose 42. A tubular member 98 is positioned in the radial passage 94 and extends laterally from the head 89. The hose 73 is received on the tubular member 98. The T-coupling 44 is threaded into the radial passage 96.

The valve member 92 has a diametrical bore 99 and an arcuate groove 101 for providing fluid communication between the passages 93 and 96 and 94 and 96, respectively. As shown in FIG. 3 the bore 99 and arcuate groove 101 are spaced from each other so that all passages may be closed thereby preventing the flow of liquid through the valve assembly. When the valve member 92 has been rotated in the direction of the arrow 102 until the bore 99 is in the position shown in FIG. 4, passages 93 and 96 are in fluid communication whereby cleaning liquid in the hose 42 will flow through the valve member 92 into the T-coupling 44 for discharge through the nozzle assemblies 48 and 49 onto the windshield 12.

When the valve member 92 has been rotated in the direction of the arrow 103 to the broken line position shown in FIG. 4 the arcuate groove 101 provides a fluid communication between the passages 94 and 96 whereby cleaning fluid under pressure from the hose 73 will flow to the T-coupling 44 which directs the cleaning fluid to the nozzle assemblies 48 and 49 for discharge onto the windshield 12.

As shown in FIG. 5 the valve member 92 extends into the cylindrical body 88 and is provided with three circumferentially spaced peripheral recesses 104, 106 and 107. Positioned in the cylindrical body 88 in alignment with the recesses 104, 106 and 107 is a spring biased detent 108, illustrated as a ball and spring held in a bore by a screw 110. The detent 108 selectively coacts with the recesses 104, 106 and 107 to index the position of the valve member 92 with respect to the body 88. Projected rearwardly and radially from the rearward end of the valve member 92 is an arm 109 which is used to angularly move the valve member 92 between the indexed positions determined by the recesses 104, 106 and 107. When the detent 108 is in the recess 104 the valve member 92 is in the closed position as shown in FIG. 3.

A radial stud 111 is threaded into the top side of the valve member 92. The outer end of the stud 111 carries a flat electrical conductor 112 which is connected to the line 54. The body 88 has a circumferential recess 113 to permit angular movement of the stud 111. A pair of electrical contacts 114 and 116 are secured to the body 88 adjacent the opposite sides of the recess 113. Each of the contacts 114 and 116 has a radial slit for receiving the flat conductor 112 mounted on the stud 111. Line 53 is connected to the contact 114 and line 87 is connected to the contact 116.

In the operation of the first washer unit 32 the valve member 92 is rotated in the direction of the arrow 102 as shown in FIG. 6 until the detent 108 is positioned in the recess 106. In this position, the electrical conductor 112 is in engagement with the electrical contact 114 thereby coupling the line 54 with the line 53. As shown in FIG. 4, the bore 99 in the valve member 92 is moved to the full line position providing fluid communication between the passages 93 and 96. The valve member 92 closes the passage 94.

To dispense liquid on the windshield 12 the operator of the vehicle moves the switch 28 to the on position thereby connecting the battery to line 54 through the contacts 112 and 114 to line 53 thereby supplying the motor 38 with electrical energy. The operation of the motor 38 and pump 39 draws cleaning fluid from the reservoir 34 and discharges under pressure cleaning fluid into the hose 42 which transports the cleaning fluid to the switch and valve assembly 43. The bore 99 provides an uninterrupted route for the flow of liquid into the T-coupling 44. As shown in FIG. 1, the T-coupling 44 is connected to the hoses 46 and 47 which carry the liquid to the nozzle assemblies 48 and 49, respectively. The cleaning fluid being under pressure in the nozzle assemblies 48 and 49 is discharged therefrom onto the windshield 12 in the path of the wiper element 21.

Under winter driving conditions, or to remove insects from the windshield, it may be desirable to dispense a specialized solvent onto the windshield. This is accomplished by using the second washer unit 33. To connect the second washer unit 33 in a fluid relation with the nozzle assemblies 48 and 49 the valve member 92 is rotated in the direction of the arrow 103 until the detent 108 is in registration with the recess 107 as shown in full lines in FIG. 6. In this position the electrical conductor 112 is in engagement with the contact 116 thereby electrically coupling the line 54 with the line 87. As shown in broken lines in FIG. 4, the arcuate groove 101 connects the passages 94 and 96 thereby providing a fluid route from the hose 73 to the T-coupling 44.

On actuation of the switch 28 the solenoid 83 is electrically coupled to the battery 31. The solenoid core 84 moves in an upward direction pivoting the lever 76 on the pin 79. This upward movement of the lever carries the valve 59 up into the container 56 with the resultant opening of the valve. The liquid in the container 56 being under gas pressure flows through the valve 59, the coupling 72 and into the hose 73. The switch and valve assembly 43 directs the fluid in the hose 73 to the T-coupling 44 which divides the flow of liquid into two separate portions transported by the hoses 46 and 47 to the nozzle assemblies 48 and 49, respectively. The liquid will be discharged as a continuous stream from the nozzle assemblies 48 and 49 as long as the valve 59 is held in an open position. When the operator of the vehicle opens the switch 28 the solenoid 83 will de-energize and the lever 76 will fall to its initial position as shown in FIG. 8. The valve 59 will automatically close thus terminating the flow of liquid from the container 56 into the hose 73.

In summary the windshield washing system 10 has a first washer unit 32 storing a cleaning liquid and operable to discharge cleaning liquid under pressure onto the windshield and a second washer unit 33 storing a second cleaning liquid under gas pressure and operable to discharge this liquid onto the windshield. A valve means is connected in a fluid relation with the first washer unit and second washer unit and with at least one nozzle assembly mounted on the vehicle forward of the windshield. The valve means has a movable member which is indexed to positions to alternately connected the first washer unit and the second washer unit with the nozzle assembly. Actuation of either the first or second washer units will discharge cleaning fluid through the nozzle assemblies onto the windshield 12.

While there have been shown, described, and pointed out the fundamental novel features of the invention it is to be understood that various omissions, substitutions, changes in form, and details of the windshield washer system illustrated may be made by those skilled in the art without departing from the spirit of the invention which is intended to be limited only as indicated by the scope of the following claims.

I claim:
1. A windshield washing system for a vehicle having a windshield and a source of energy comprising:
   (a) a first washer unit having a reservoir for storing a first cleaning liquid, pump means for moving the first liquid from the reservoir under pressure and motor means for operating said pump means,
   (b) a second washer unit having a container for storing a second cleaning liquid under gas pressure, valve means movable to open and closed positions for controlling the flow of liquid from said container, lever means engageable with said valve means for moving said valve means to the open position, and solenoid means operably connected to said lever means for moving the lever means to a position to open the valve means,
   (c) nozzle means for directing liquid to the windshield, and
   (d) a switch and valve assembly having a switch section and a valve section for selectively connecting the motor means to the source of energy and the pump means in a fluid communicating relation with the nozzle means whereby upon actuation of the motor means the pump means discharges the first cleaning fluid under pressure to said valve section which directs said fluid to the nozzle means, and for selectively connecting the solenoid means to the source of energy and the valve means in a fluid communicating relation with the nozzle means whereby upon actuation of the solenoid means the second fluid is dispensed from said container and directed by the valve section to the nozzle means.

2. A windshield washing system for a vehicle having a windshield and a source of energy comprising:
   (a) a first washer unit having a reservoir for storing a first cleaning liquid, pump means for moving the first liquid from the reservoir under pressure and motor means for operating said pump means,
   (b) a second washer unit having a container for storing a second cleaning liquid under pressure, valve means movable to open and closed positions for controlling the flow of liquid from said container, and solenoid means operably connected to said valve means for moving the valve means to an open position therefor,
   (c) nozzle means for directing liquid to the windshield, and
   (d) a switch and valve assembly having a switch section and a valve section for selectively connecting the motor means to the source of energy and the pump means in a fluid communicating relation with the nozzle means whereby upon actuation of the motor means the pump means discharges the first cleaning fluid under pressure to said valve section which directs said fluid to the nozzle means, and for selectively connecting the solenoid means to the source of energy and the valve means in a fluid communicating relation with the nozzle means whereby upon actuation of the solenoid means the second fluid is dispensed from said container and directed by the valve section to the nozzle means.

References Cited by the Examiner
UNITED STATES PATENTS

| | | | |
|---|---|---|---|
| 2,914,256 | 11/1959 | O'Shei | 239—284 |
| 2,941,728 | 6/1960 | Paldanius | 239—284 |
| 2,967,643 | 1/1961 | Edelstein et al. | 239—70 |
| 2,991,912 | 7/1961 | Thomas et al. | 239—70 |
| 3,127,060 | 3/1964 | Vosbikian et al. | |

OTHER REFERENCES

A. Herzka and J. Picktholl: Pressurized Packaging, published by Butterworths Scientific Publications, London, 1958, pp. 40, 74, 75 and 339.

EVERETT W. KIRBY, *Primary Examiner.*